United States Patent

[11] 3,618,029

[72] Inventor Robert M. Graven
1709 Shattuck Ave., Berkeley, Calif. 94709
[21] Appl. No. 33,855
[22] Filed May 1, 1970
[45] Patented Nov. 2, 1971
Continuation-in-part of application Ser. No. 644,756, May 25, 1967, now abandoned.

[54] DRAWING BOARD, A GRAPHICAL INPUT-OUTPUT DEVICE FOR A COMPUTER
7 Claims, 9 Drawing Figs.

[52] U.S. Cl. .......... 340/172.5, 315/169
[51] Int. Cl. .......... G06f 3/00, G06k 15/18
[50] Field of Search .......... 340/172.5; 235/157; 315/169, 161; 313/108 D

[56] References Cited
UNITED STATES PATENTS

| | | | |
|---|---|---|---|
| 3,283,160 | 11/1966 | Levitt et al. | 313/108 |
| 3,300,581 | 1/1967 | Steinmeyer | 315/169 |
| 3,341,857 | 9/1967 | Kabell | 313/108 |
| 3,351,937 | 11/1967 | Spens | 315/169 |
| 3,358,185 | 12/1967 | Lally | 315/169 |
| 3,399,401 | 8/1968 | Ellis et al. | 340/172.5 |

*Primary Examiner*—Gareth D. Shaw
*Attorney*—Bruce & McCoy

ABSTRACT: A two-dimensional matrix of semiconductors is arranged in ordered array as a flat, light-emitting and light-sensing device for input and readout of information from a computer. A penlight is used to activate the light-sensing semiconductors to achieve a graphical input. Operation of the device can be either incremental or random.

INVENTOR.
ROBERT M. GRAVEN
BY Bruce, McCoy & Tipton
ATTORNEYS

INVENTOR.
ROBERT M. GRAVEN
BY Bruce, McCoy & [illegible]
ATTORNEYS

INVENTOR.
ROBERT M. GRAVEN
BY Bruce, McCoy & Tipton
ATTORNEYS

DRAWING BOARD, A GRAPHICAL INPUT-OUTPUT DEVICE FOR A COMPUTER

CROSS-REFERENCE TO RELATED APPLICATION

This specification is a continuation-in-part application of U.S. Pat. application, Ser. No. 644,756 filed May 25, 1967, for DRAWINGBOARD, A GRAPHICAL INPUT-OUTPUT DEVICE and now abandoned.

BACKGROUND OF THE INVENTION

This invention relates generally to registers and in particular to electrical calculators of the hybrid type.

In many computer systems, a cathode ray tube display is available which will produce a graphical representation of the information contained in the computer system. These systems may obtain their information input through the use of a light pen whose photosensitive cell is directed at the surface of the cathode ray tube.

Other graphical input-output computer systems are known which comprise a flat matrix of electrical terminals which are connected to the computer and capacitively coupled to a metal stylus which acts as a writing instrument.

SUMMARY OF THE INVENTION

The device of the present invention is a flat graphical input-output device for a computer using light sensors to receive information, with light emitters juxtaposed to corresponding sensors to display the information. A penlight, i.e., a "pen" or light-emitting device held in the hand of an operator, is used to activate the light sensors.

It is therefore, an object of the present invention to provide a graphical input-output device for a computer that is flat, can be added to in order to increase its area, and which emits and senses light.

It is another object of this invention to provide a graphical input-output device that is compact, lightweight and vibration resistant.

It is still another object of the present invention to provide a graphical input-output device for a computer having individual point control.

It is yet another object of the present invention to provide a graphical input-output device for a computer which operates at a low voltage.

It is another object of this invention to provide a graphical input-output device for a computer having an arbitrary data point density or resolution ability.

It is also an object of the present invention to provide a computer with additional information storage elements.

It is an object of the present invention to provide a graphical input-output device for a computer having dynamic input and output displays.

It is an object of the present invention to provide a light-emitting device that is used for manual input of graphic information.

It is another object of the present invention to provide a graphical input-output device for computer which can be used with conventional drafting tools.

Other and more particular objects of the present invention will be manifest upon study of the following detailed description when taken together with the drawings.

DESCRIPTION OF THE PREFERRED EMBODIMENT

Figure 1:
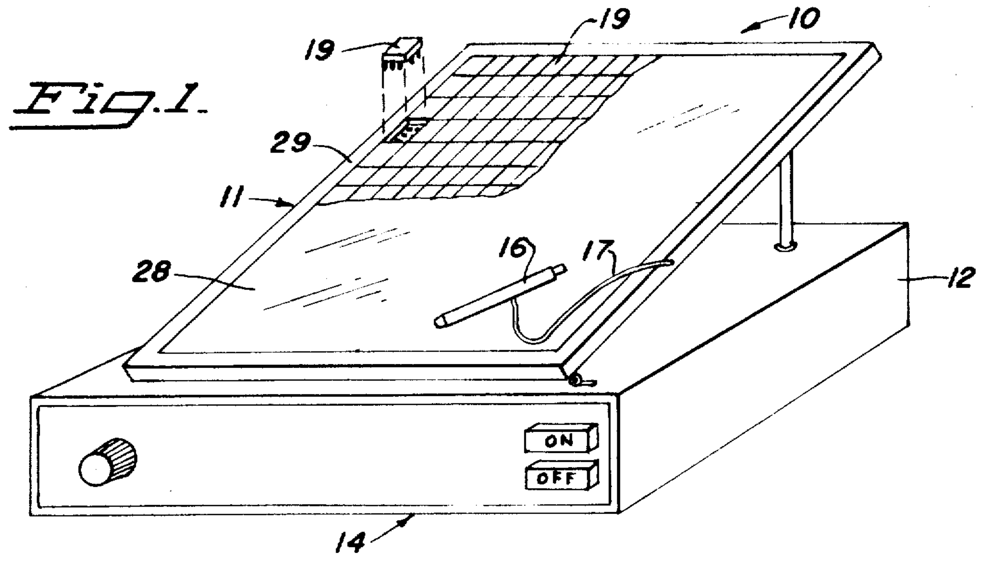
FIG. 1 is an isometric view of the graphical input-output device of the present invention.

With reference to FIG. 1, the graphical input-output device 10 of the present invention comprises basically a write and display board 11, i.e., input-output drawingboard, mounted on an electronics or power supply cabinet 12 and having on the front thereof a control panel 14.

A penlight 16 is electrically connected to board 11 by two or more conductors 17 for control of the light output of the pen and, as will be described below, for control of the computer.

Figures 4, 5, 6, 7, 9:
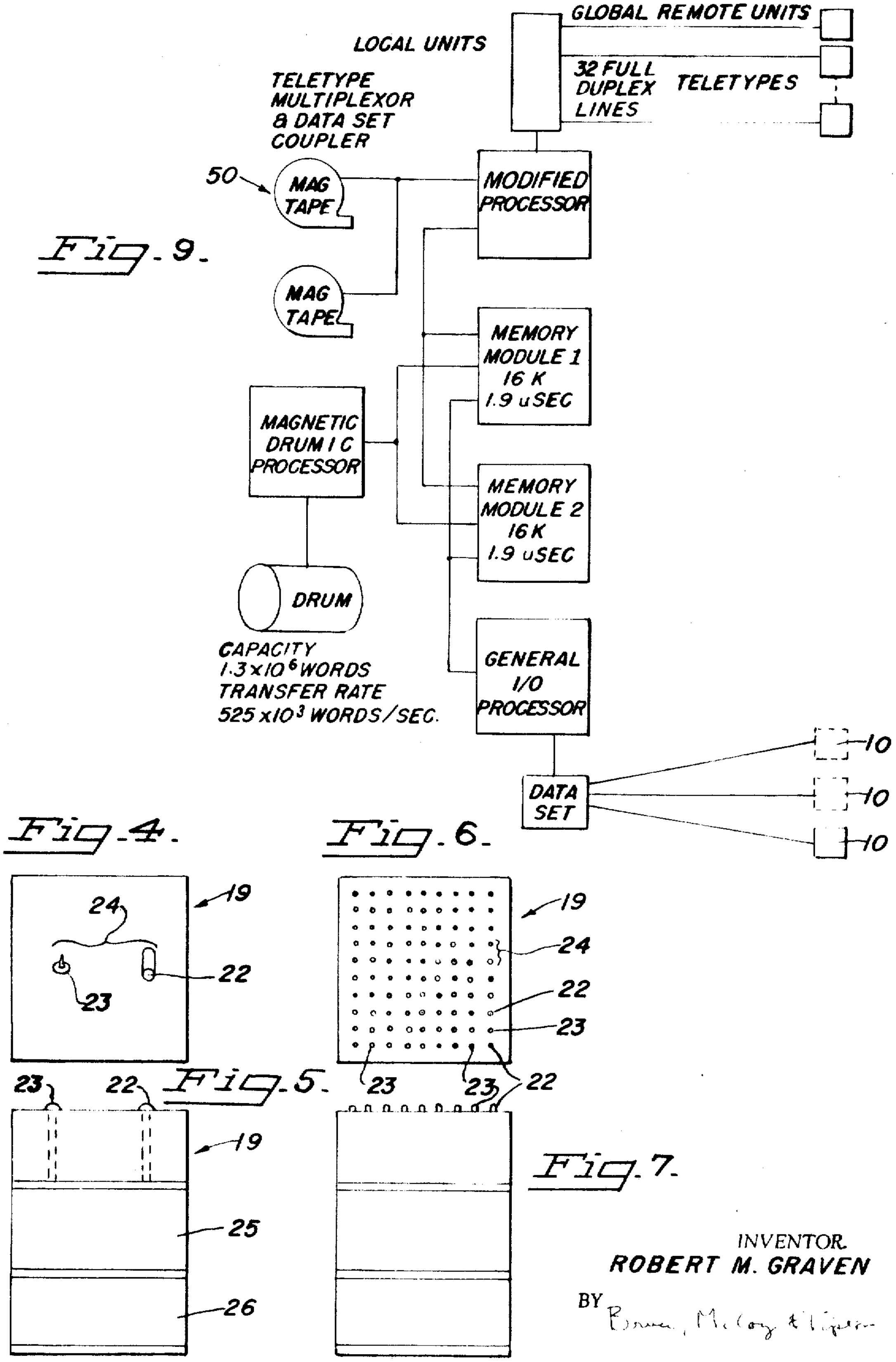
FIG. 4 is a plan view of a typical low density sensor-emitter module or pair.
FIG. 5 is a sectional elevational view of a typical low-density sensor-emitter module or pair.
FIG. 6 is a plan view of a typical high-density sensor-emitter module.
FIG. 7 is a sectional elevational view of a typical high-density sensor-emitter module.
FIG. 9 is a block circuit diagram showing the method of connection of the graphical input-output device of the present invention to a typical computer system well known in the art.

Board 11 further comprises modular circuit units 19 shown, typically, in greater detail in FIG. 4, through 7.

Board 11 is connected into a typical computer system generally as shown in FIG. 9 and, as can be seen from the figures, provides a technique of placing into the computer for operation therein, information which is graphical in nature, i.e., information which can be displayed by means of coordinates, generally horizontal and vertical coordinates.

The computer elements illustrated and labeled in FIG. 9 are generally well known in the art and are shown for the general purpose of indicating the relationship of input-output device 10 with respect to a typical computer system, such as described and shown in "A Facility for Experimentation in Man-Machine Interaction," W. W. Lichtenberger and M. W. Pirtle, pp. 589–594, Proc. AFIPS Conf., 1965, Spartan Books, 1250 Connecticut Avenue, N.W., Wash., D. C., Library of Congress Cat. No. 55–44701.

With reference to FIGS. 4 and 5, information is placed into the computer by activating light-sensing devices 22, while information is displayed by means of light-emitting devices 23, both of which are juxtaposed in generally the same plane in board 11 of FIG. 1.

With particular reference to FIG. 5, the circuitry for operating sensors 22 and emitters 23 are disposed in layers 25 and 26 which may be printed circuits or other miniaturized circuits, i.e., integrated circuits.

With reference again to FIG. 1, board potion 11 comprises a transparent surface or glass plate 28 held in place by a frame 29.

Directly under glass plate 28 is a plurality of modular circuit units 19 previously described juxtaposed in a common plane and arranged in ordered array to define a matrix.

Referring again to FIGS. 4 through 7, each unit 19 may contain from 1 to 50 or more sensor-emitter pairs 24. Each circuit unit 19 may contain as many sensors 22 and emitters 23 as are needed or that there is the manufacturing ability to produce.

For simplification of terminology, each sensor-emitter pair 24 will be referred to as a "data point" 24 or "point" 24. A typical point 24 would be the sensor-emitter pair shown in FIG. 4. It can be seen that each point represents the condition of one-bit memory, i.e., the emitter is either activated ("on") or deactivated ("off") and can be visually so indicated by the "on" or "off" status of emitter 23.

Figure 8:
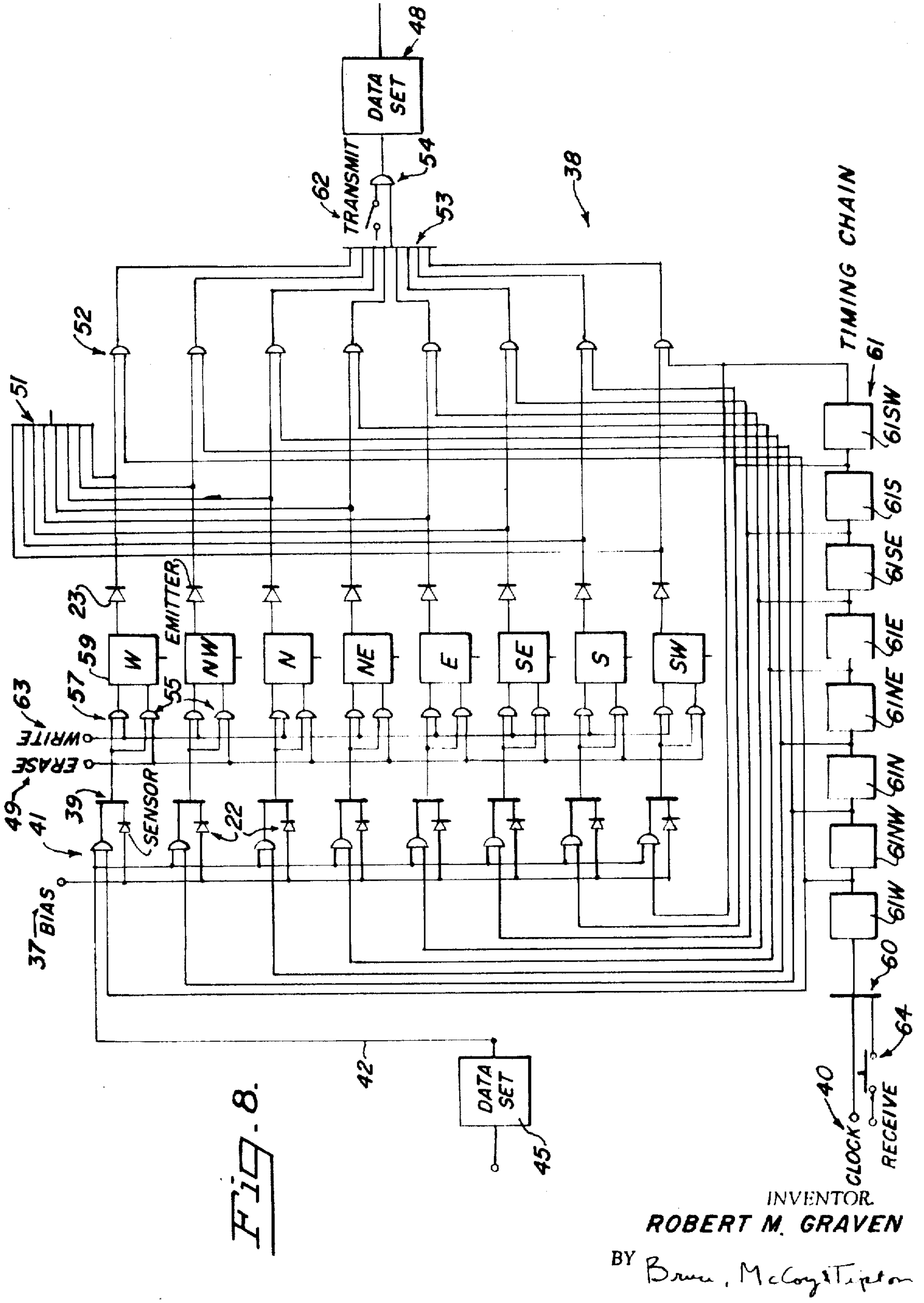
FIG. 8 is a circuit diagram of a typical graphical input-output device of the present invention for an eight point matrix.

FIG. 8 is a circuit diagram for an eight point graphical input-output device, using commercially available sensors 22 and emitters 23.

It can be seen that the density of points per square inch can be increased by merely multiplying the number of circuits, and by the use of integrated circuits, which method of construction is well known in the art.

With reference to FIGS. 4 and 8, sensor 22 is, for the present embodiment, a photodiode, that is, a solid state or metal-oxide semiconductor which is activated when exposed to light.

Emitter 23 is an electroluminescent light source such as Ga-As-P (Gallium-Arsenic-Phosphorus) diode, i.e., a crystal arranged to form a pn junction and having the ability to electroluminesce when a current flows in a particular direction across the function. Such light emitting devices are well known in the art and the method of construction of such a diode forms no part of the present invention.

The color of light emitted by the Ga-As-P diode emitter is of red hue. By appropriate selection of light filters or semiconductor crystals, colors such as green or yellow may be obtained for the purpose of achieving output data in various hues and mixtures thereof.

Figures 2, 3:
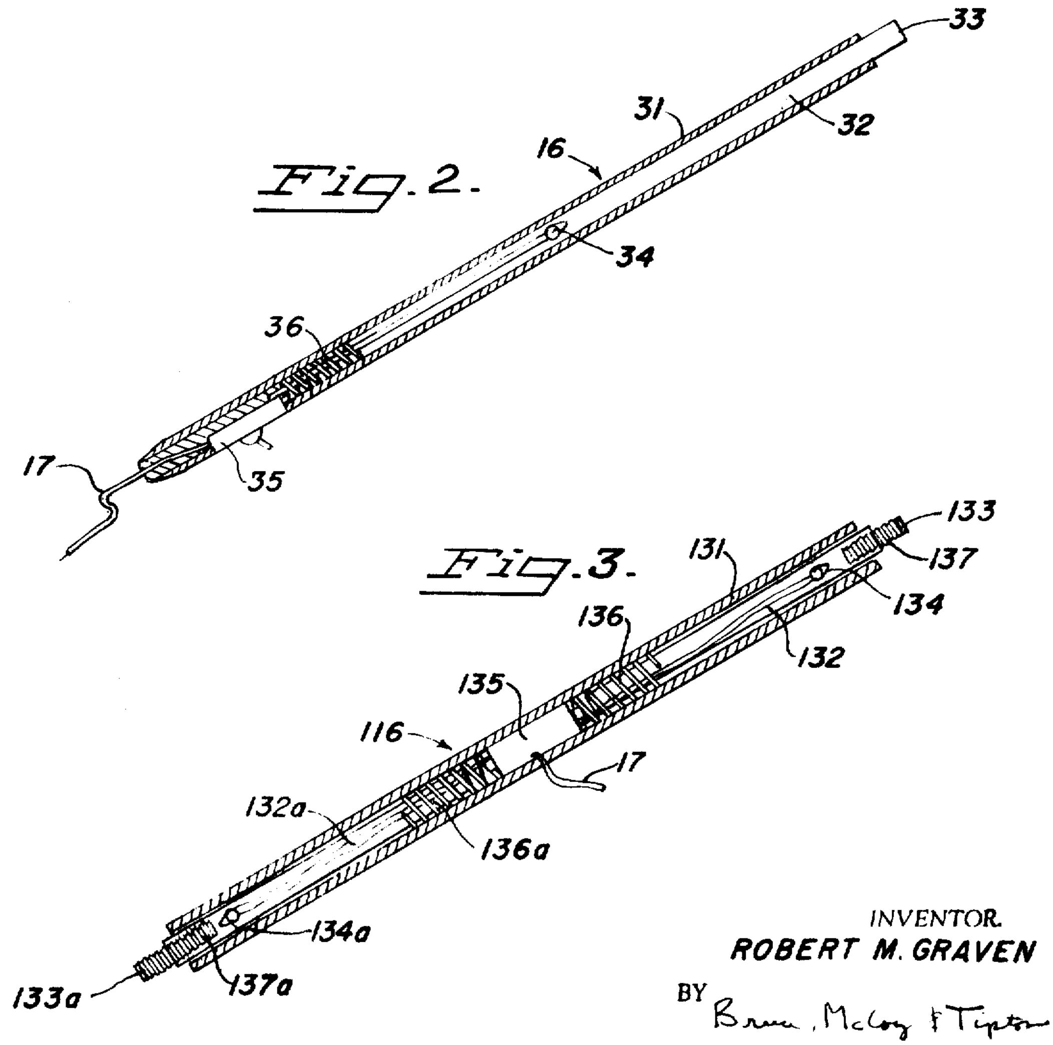
FIG. 2 is an elevational view of a first embodiment of a penlight used to place information into the graphical device of FIG. 1.
FIG. 3 is an elevational view of a second embodiment of a penlight used to place information into and erase information from the graphical device of FIG. 1.

To activate sensors 22, penlight 16, illustrated in FIG. 2 is held in a manner to direct light to the light sensing devices.

FIG. 2 illustrates a penlight 16 which comprises, basically a cylindrical holder 31 containing a light transmitting guide 32, i.e., a clear plastic rod utilizing internal reflection for conducting the light, having a tip 33, protruding from one end of holder 31 and slidable therein, a light source 34 encased in said light transmitting guide 32, a switch 35 inside holder 31 proximate the end of light guide 32 and a spring 36 between switch 35 and light guide 32 biased to keep guide 32 from activating switch 35 except when sufficient pressure is applied to tip 33. Conductors 17 are connected to light source 34 and switch 35, and are connected to a power source to energize light 34 and communicate with the computer (not shown in FIG. 2) to indicate that input is occurring.

FIG. 3 illustrates a second embodiment of a penlight 116 similar to penlight 16 of FIG. 2; however, provided with dual light sources and switches for input and erase functions.

One-half of housing 131 contains a light source 134 within a light transmitting guide 132 having a lens 137 in a threaded hole whose tip 133 protrudes from one end of housing 131.

The other half of housing 131 contains a comparable arrangement of a light source 134*a*, a light transmitting guide 132*a*, and a threaded lens 137*a*.

In the center of housing 131 is a switch 135 disposed between guides 132 and 132*a* with springs 136 and 136*a* biased to hold guides 132 and 132*a*, respectively, away from switch 135.

Switch 135, as in the case of switch 35, is connected to the computer and a power source (not shown in FIG. 3).

To activate penlight 16, the pen is placed with tip 33 for a display board 11 and holder 31 is pushed down causing guide 32 to overcome the bias of spring 36 and activate switch 35.

Referring to FiG. 8, there is shown a circuit diagram 38 for a typical 8 point graphical input-output device of the present invention.

Data points are individually identified by the letters W, NW, N, NE, E, SE, S, and SW which are abbreviations for the points of the compass and correspond to positions on display board 11.

Sensors 22 corresponding to emitters 23 are shown connected and are juxtaposed as illustrated in FIGS. 4 and 5.

In the circuit illustrated, the "DATA SET" 48 on the transmit side of the circuit is connected to a computer (not shown) by telephone lines, or this "DATA SET" may be eliminated and the circuit connected directly to the computer. Time delay in timing chain 61, comprising links 61W through 61SW, which are devices common in the art, namely monostable multivibrators, may be modified accordingly depending upon the ability of the computer to receive the information.

The timing chain 61 sequentially gates data, which is represented by a voltage on line 42, from the computer through "AND"-gates 41 into locations W, NW, N, etc., i.e., in a counterclockwise manner starting at the west W then moving north to position NW, then N, etc., and back to W.

In particular, with reference to FIG. 8, circuit 38 is connected to a computer (SEE FIG. 9) by means of data sets 45 and 48 for circuit 38 input and output respectively. Data sets 45 and 48 are merely a means for coupling the circuit to the computer and are devices which are common in the art.

The symbols used in FIG. 8 are adapted from Military Standard 806B well known in the art, except the symbol for the "OR" gates which is a symbol also common the art and easily identified by persons skilled in the art.

For convenience, when referring to "AND"-gates 41, 52, 55 and 57, and "OR"-gates 39 specifically, we will use the appropriate suffix letters corresponding to those used on bistable multivibrator or flip-flop circuits 59. For example, the gates controlling the flow of current through flip-flop circuits 59W will be identified as gates 41W, 39W, 57W, 55W and 52W. The same notation will be used for emitters and sensors, e.g., 23W and 22W.

From circuit 38, it can be seen that if a sensor, (such as 22E) were exposed to light, and a bias voltage applied to "-BIAS" circuit 37, (to the left or input side of sensor 22E) and to "WRITE" circuit 63, then a current will be allowed to flow through the sensor 22E and through "OR"-gate 39E to "AND"-gate 57E to cause bistable multivibrator 59E to conduct a current through emitter 23E, (causing it to emit light) to "OR"-gate 51 and apply a voltage to one side of "AND"-gate 52E. Flip-flop 59E is then "LOCKED" in the "ON" condition. Hence, no computer action is required to optically activate the emitters.

To transmit the condition of the circuits to the computer, a data set 48 is used as a couple. Such "DATA SET" is common in the art and is used when transmitting information over the telephone lines. A direct connection to a computer would be easier if the remote capability of telephone lines is not required. For transmitting information directly to the computer (not shown) the connection is made to the output, (RIGHT in the circuit diagram) side of "AND"-gate 54.

To transmit, switch 62 is closed, which enables signals to pass through "AND"-gate 54, and timing chain 61 is caused by clock 40 to sequentially, beginning with "AND"-gate 52W and ending with "AND"-gate 52SW, apply a voltage to gates 52. Since in this example only "AND"-gate 52E has a voltage applied to both its input sides, a pulse of current will pass through gate 52E and no others, thus indicating to the computer that only emitter 23E is activated.

To place information into circuit 38, a computer is connected in common, either by data set 45 or by wires, to conductor 42, which is connected to one side of "AND"-gates 41. A clock 40 is synchronized with the computer and used to trigger timing chain 61. A bias voltage is applied to "WRITE" circuit 63 connected in common to "AND"-gates 57.

If, for example, it is desired to activate or turn "ON" emitters 23NW and 23S, the computer would apply a voltage pulse on line 42 concurrently with the triggering of link 61NW and 61S in timing chain 61.

When link 61W is triggered, a voltage pulse will appear on only one side of "AND"-gate 41W, thus not permitting a current to flow. However, when line 61NW is triggered concurrently with a voltage pulse from the computer, a current will flow through "AND"-gate 41Nw, "OR"-gate 39NW, and a voltage pulse will appear at the input side of "AND"-gate 57NW. Since a bias voltage is already applied to the other side of "AND"-gate 57NW from "WRITE" circuit 63, a current will then be permitted to flow through "AND"-gate 57NW and flip-flop 59NW to activate emitter 23NW.

As timing chain 61 continues to trigger sequentially from link to link, no emitter 23 will be activated until the computer emits another voltage pulse synchronously with the firing of line 61S causing, in the manner described above, emitter 23S, to turn "ON" and remain "ON."

To "erase" or turn an emitter 23 "OFF" a bias voltage is applied to "ERASE" circuit 49 such that flip-flop 59 will operate to turn emitter 23 "OFF" in a manner analogous to that described above for turning emitter 23 "ON."

The counterclockwise order of gating in FIG. 8 is generally illustrative of one method. Other sequences can be used such as clockwise or back and forth.

In a like manner, as can be seen from FIG. 8, information can be gated into bistable elements 59 either through "-WRITE" gates 57 or "ERASE" gates 55 when sensors 22 are activated by electromagnetic radiation.

To manually operate graphical input-output device 10 of the present invention, penlight 16 is operated as previously described to activate sensors 22 in any manner, or pattern desired, such as individual sensors 22 in a random pattern, or a locus of sensors 22 in an incremental mode. Therefore emitters 23 can be written (activated) or erased (deactivated) without the computer using the penlight.

The timing chain 61 can be triggered through "OR" gate 60 either electronically by the computer or manually by pushing the "RECEIVE" button 64 to pass the information as to which point has been set, (activated) to the computer assuming the transmit switch 62 is activated. In FIG. 8, each sensor-emitter pair 24 has a unique position in the eight bit data segment transmitted in the computer.

The flip-flops 59 are the information storage elements. A person can read the states of each point by observing if the lamps are on or off.

FIG. 9 illustrates the configuration of computer equipment 50 used to show how graphical input-output device 10 of the present invention is connected to a computer.

Device 10 is shown connected to a "DATA SET" which is a means common in the art for making a connection to a computer, similar to the data set of circuit diagram 38 of FIG. 8. The "DATA SET" is in turn connected to a general processor of the computer 50 which in turn is connected to the various memory modules and magnetic drum and tape units which are common in the art.

Thus, graphical information in device 10 as previously described enters computer 50 through the data set or wires in a manner acceptable to the particular computer. In a like manner, graphical data may be placed in device 10 as previously described from computer 50. Also, graphical data may be placed (written) or removed (erased) in device 10 as previously described by a man using the input device 16.

I claim:

1. A graphical input-output device for a computer comprising a plurality of light emitter-sensor pairs juxtaposed in a common plane and arranged in ordered array to permit emission and reception of light energy on one common side of said plane, means for activating and deactivating said light emitter-sensor pairs, and means for connecting said light emitter-sensor pairs to a computer.

2. The graphical input-output device for a computer as claimed in claim 1 wherein said means for activating said light sensors comprises a penlight.

3. The graphical input-output device for a computer as claimed in claim 1 wherein said means for connecting light emitter-sensor pairs to a computer comprises means for sequentially connecting each of said emitter-sensor pairs to said computer.

4. The graphical input-output device for a computer as claimed in claim 3 wherein said means for sequentially connecting each of said emitter-sensor pairs to said computer comprises a timing chain circuit and means for activating said circuit.

5. The graphical input-output device for a computer as claimed in claim 1 wherein said light emitter of said light emitter-sensor pair comprises a Ga-As-P light-emitting diode, and said light sensor of said light emitter-sensor pair comprises a photosensitive diode.

6. The graphical input-output device for a computer as claimed in claim 1 further comprising means for maintaining said emitters in the activated and inactivated condition whereby information is stored in said device.

7. The graphical input-output device for a computer as claimed in claim 1 wherein said means for connecting said light emitter-sensor pairs to said computer include means for coupling said device to telephone lines connected to said computer.

* * * * *